United States Patent
Hou et al.

(10) Patent No.: US 10,126,784 B2
(45) Date of Patent: Nov. 13, 2018

(54) TERMINAL

(71) Applicant: Huawei Technologies Co., Ltd., Shenzhen (CN)

(72) Inventors: Zhiming Hou, Shenzhen (CN); Ke Zhang, Shenzhen (CN); Xuzhi Guo, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/514,425

(22) PCT Filed: Sep. 25, 2014

(86) PCT No.: PCT/CN2014/087375
§ 371 (c)(1),
(2) Date: Mar. 24, 2017

(87) PCT Pub. No.: WO2016/045025
PCT Pub. Date: Mar. 31, 2016

(65) Prior Publication Data
US 2017/0293322 A1 Oct. 12, 2017

(51) Int. Cl.
*G11B 33/02* (2006.01)
*G06F 1/16* (2006.01)
*H01H 27/00* (2006.01)
*H01H 9/22* (2006.01)

(52) U.S. Cl.
CPC .......... *G06F 1/1656* (2013.01); *G06F 1/1613* (2013.01); *H01H 27/002* (2013.01); *H01H 9/226* (2013.01)

(58) Field of Classification Search
CPC .......... G06F 1/187; G06F 1/184; G06F 21/31; G06F 7/1008; G11B 33/02; G11B 33/128; G11B 25/04
USPC .......... 369/75.11; 360/75; 713/320; 361/679.33
See application file for complete search history.

(56) References Cited

U.S. PATENT DOCUMENTS

| 5,126,890 A | 6/1992 | Wade et al. |
| 6,595,605 B1 | 7/2003 | Babcock et al. |
| 2010/0046343 A1 | 2/2010 | Tsai |
| 2010/0209065 A1 | 8/2010 | Ruiz et al. |

(Continued)

FOREIGN PATENT DOCUMENTS

| CN | 1731362 A | 2/2006 |
| CN | 101128093 A | 2/2008 |
| CN | 201153042 Y | 11/2008 |

(Continued)

*Primary Examiner* — Nabil Hindi
(74) *Attorney, Agent, or Firm* — Slater Matsil, LLP

(57) ABSTRACT

Embodiments provide a terminal, and the terminal includes a body, a cover body covering the body, a circuit board mounted in the body, a central processing unit welded on the circuit board, a control part mounted on the cover body, and a protection switch welded on the circuit board. A hard disk slot for accommodating a hard disk is disposed in the body. The cover body is detachably mounted on the body, and is configured to seal the hard disk in the hard disk slot. The cover body is opened to drive the control part to open the protection switch. An electrical signal variation is generated due to opening of the protection switch. After detecting the electrical signal variation, the central processing unit instructs the hard disk to perform data protection and powers off the hard disk.

16 Claims, 4 Drawing Sheets

(56) References Cited

U.S. PATENT DOCUMENTS

2010/0242115 A1    9/2010   Shi et al.
2011/0170255 A1    7/2011   Kouyama et al.

FOREIGN PATENT DOCUMENTS

| CN | 201219031 Y | 4/2009 |
|----|-------------|--------|
| CN | 102129870 A | 7/2011 |
| CN | 201918159 U | 8/2011 |
| CN | 202677842 U | 1/2013 |
| EP | 0421361 A2 | 4/1991 |
| EP | 0426134 A2 | 5/1991 |
| EP | 0800175 A1 | 10/1997 |
| EP | 2040143 A2 | 3/2009 |
| GB | 2290401 A | 12/1995 |

TERMINAL

CROSS-REFERENCE TO RELATED APPLICATIONS

This application is a national stage of International Application No. PCT/CN2014/087375, filed on Sep. 25, 2014, which application is hereby incorporated by reference in its entirety.

TECHNICAL FIELD

The present invention relates to the electronic device field, and specifically, to a terminal.

BACKGROUND

With rapid development of mobile communications technologies and improvement of hardware system performance, users also have increasing requirements on file storage. An existing USB flash drive or optical disc can no longer meet storage requirements. A hard disk is usually used as a storage medium, and in addition, it is required that the hard disk is inserted and removed conveniently, so that a common home terminal user can replace the hard disk very conveniently. However, the hard disk cannot be inserted or removed with power on, and the hard disk cannot be removed randomly when running at a high speed. Otherwise, the hard disk may be damaged, which causes a user information loss. To prevent the hard disk from being damaged because the common home terminal user randomly inserts or removes the hard disk, a defense apparatus needs to be designed.

SUMMARY

Embodiments of the present invention provide a terminal.

According to a first aspect, a terminal is provided. The terminal includes a body, a cover body covering the body, a circuit board mounted in the body, a central processing unit welded on the circuit board, a control part mounted on the cover body, and a protection switch welded on the circuit board. A hard disk slot for accommodating a hard disk is disposed in the body. The cover body is detachably mounted on the body, and is configured to seal the hard disk in the hard disk slot. The cover body is opened to drive the control part to open the protection switch. An electrical signal variation is generated due to opening of the protection switch, and after detecting the electrical signal variation, the central processing unit instructs the hard disk to perform data protection and powers off the hard disk.

In a first possible implementation manner of the first aspect, the protection switch is a touch switch, and the cover body drives the control part to press the touch switch, to open the touch switch.

With reference to the first possible implementation manner of the first aspect, in a second possible implementation manner, the terminal further includes a door interlock switch, where the door interlock switch includes a locker mounted on a surface of the cover body and a lock cylinder that is mounted on the body and that is opposite to the locker, and the door interlock switch locks and keeps the cover body on the body.

In a third possible implementation manner of the first aspect, the protection switch is a travel switch, and the cover body drives the control part to depart from the travel switch, to open the travel switch.

With reference to the third possible implementation manner of the first aspect, in a fourth possible implementation manner, an abutting face is disposed on an end part, of the control part, opposite to the protection switch, where the abutting face abuts against the protection switch.

With reference to the fourth possible implementation manner of the first aspect, in a fifth possible implementation manner, the cover body and the body are locked and fastened in a magnet adsorption manner.

With reference to the fourth possible implementation manner of the first aspect, in a sixth possible implementation manner, the cover body and the body are locked and fastened in a clamping and holding manner by using a clamping buckle and a clamping hook.

With reference to any one of the first aspect or the first to the sixth possible implementation manners of the first aspect, in a seventh possible implementation manner, a guide post is disposed on the cover body, the guide post and the control part are disposed on a same surface of the cover body, and a guide hole corresponding to the guide post is disposed in the body.

With reference to any one of the first aspect or the first to the sixth possible implementation manners of the first aspect, in an eighth possible implementation manner, the hard disk slot is located on an end of the body, the protection switch and the hard disk slot are in adjacent positions, and the cover body covers an end part, of the body, on which the hard disk slot is disposed.

With reference to any one of the first aspect or the first to the sixth possible implementation manners of the first aspect, in a ninth possible implementation manner, the terminal is a router, a network server, or a set top box.

In conclusion, in the terminal of the present invention, before a hard disk is removed, a cover body is opened, and a protection switch is touched at the same time, to stop the hard disk from transmitting data, and prevent a data loss because the hard disk is removed with power on, thereby protecting hard disk data.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
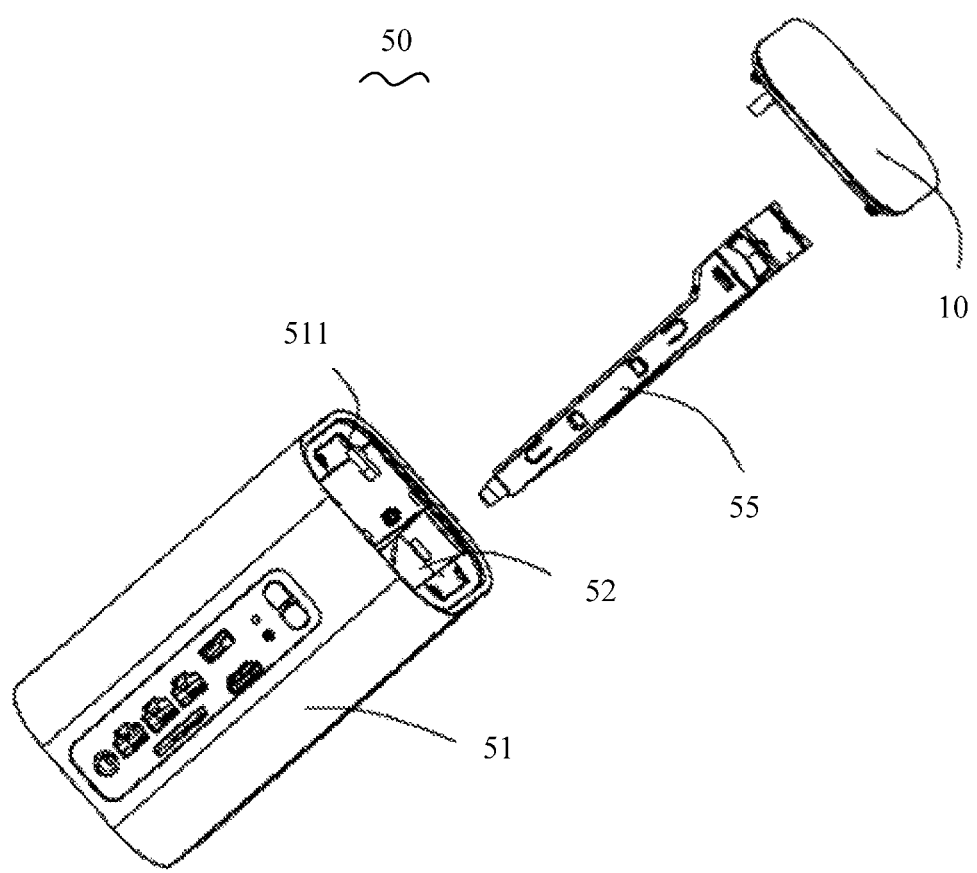
FIG. 1 is a schematic structural diagram of an intelligent connector in a terminal according to the present invention.

The following clearly and completely describes the technical solutions in the implementation manners of the present invention with reference to the accompanying drawings in the implementation manners of the present invention.

An embodiment of the present invention provides a terminal, and the terminal includes a body, a cover body, a circuit board mounted in the body, a central processing unit welded on the circuit board, a control part mounted on the cover body, and a protection switch welded on the circuit board. A hard disk slot for accommodating a hard disk is disposed in the body, the cover body is detachably mounted on the body, and is configured to seal the hard disk in the hard disk slot. The cover body is opened to drive the control part to open the protection switch, an electrical signal variation is generated due to opening of the protection switch, and after detecting the electrical signal variation, the central processing unit instructs the hard disk to perform data protection and powers off the hard disk.

Optionally, the hard disk slot is located on an end of the body, the protection switch and the hard disk slot are in adjacent positions, and the cover body covers an end part, of the body, on which the hard disk slot is disposed.

It should be noted that, the terminal may be an electronic terminal into which a hard disk needs to be inserted and from which a hard disk needs to be removed, such as a router, a network server, or a set top box. The protection switch may be a touch switch or a travel switch, and the control part used together with the touch switch or the travel switch may be rod-shaped or protruded.

It should be noted that, the electrical signal variation generated due to opening of the protection switch refers to a variation of an electrical signal from one state to another when the protection switch is opened. For example, if an electrical signal is identified by using a voltage, the electrical signal variation may be a variation from a high level to a low level or a variation from a low level to a high level. In an actual product implementation process, a manner of detecting the electrical signal variation is related to an implementation principle of an actually used protection switch, and this embodiment of the present invention sets no specific limitation.

An electrical signal variation generated when the protection switch is closed after being opened is also a variation from one state to another, and this variation is opposite to the electrical signal variation that is generated after the protection switch is opened. In this case, it indicates that the hard disk is installed into the terminal again, and the central processing unit may power on the hard disk for working again.

When the protection switch is a touch switch, the cover body and the body are locked and fastened by using a door interlock switch, and the cover body may be opened by pressing the cover body towards the body. In a process of pressing the cover body towards the body, the cover body drives the control part to press the touch switch, so that the touch switch is opened. An electrical signal variation is generated due to opening of the touch switch, and after detecting the electrical signal variation, the central processing unit instructs the hard disk to perform data protection and powers off the hard disk. In this embodiment of the present invention, the control part is rod-shaped, and the door interlock switch includes a locker mounted on a surface of the cover body and a lock cylinder that is mounted on the body and that is opposite to the locker.

When the protection switch is a travel switch, the travel switch is in a closed state when the control part is in contact with the travel switch. The cover body and the body are fastened in a magnet adsorption manner or fastened in an engaging manner by using a clamping hook and a clamping buckle, and the cover body may be directly opened relative to the body. When the cover body is being opened, the control rod is driven to depart from the travel switch, to open the travel switch. An electrical signal variation is generated due to opening of the travel switch, and after detecting the electrical signal variation, the central processing unit instructs the hard disk to perform data protection and powers off the hard disk, and the hard disk can be removed safely.

It may be understood that, to facilitate installation of the cover body and the body, a guide post is disposed on the cover body, the guide post and the control part are disposed on a same surface of the cover body, and a guide hole corresponding to the guide post is disposed in the body.

The control part and the protection switch are disposed in the terminal provided in this embodiment of the present invention, and the cover body is opened to drive the control part to open the protection switch, so that after detecting an electrical signal variation generated due to opening of the protection switch, the central processing unit instructs the hard disk to perform data protection and powers off the hard disk. Therefore, the hard disk can be powered off and stop working before being removed, thereby effectively preventing the hard disk from being damaged when the hard disk is being removed.

Figure 2:
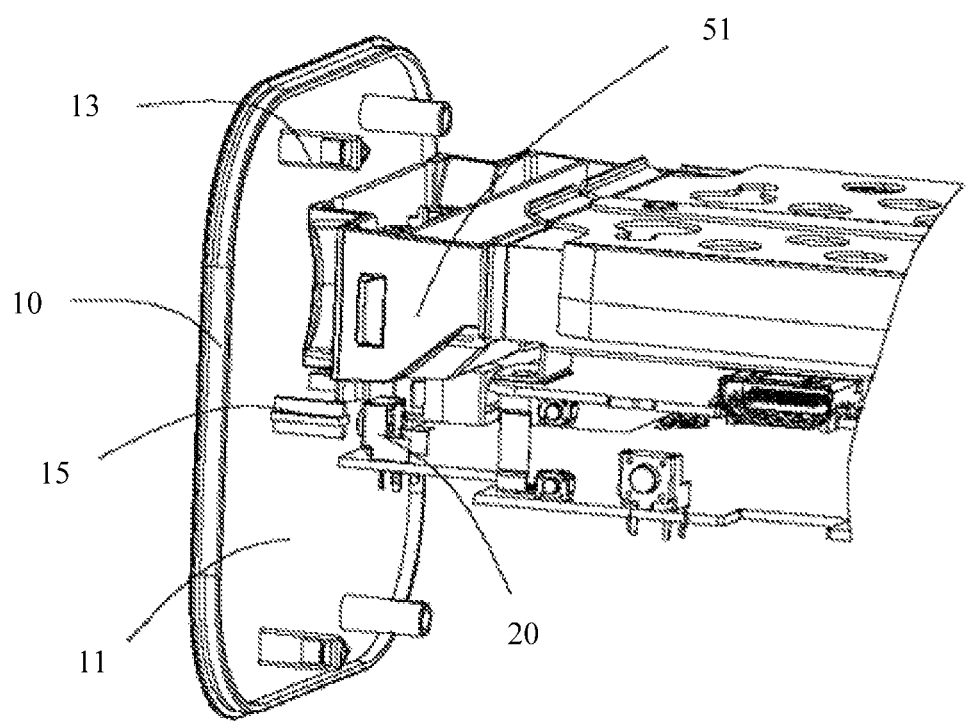
FIG. 2 is a schematic structural diagram in which a touch switch is used for the intelligent connector shown in FIG. 1.

Referring to FIG. 1 and FIG. 2, the following uses a router 100 as an example for specific description. The router 100 includes a body 51, a cover body 10, a central processing unit (not shown in the figure), a circuit board (not shown in the figure), a control part (not shown in the figure), and a protection switch (not shown in the figure). The central processing unit and the protection switch are welded on the circuit board. A hard disk slot 52 for accommodating a hard disk 55 is disposed in the body 51. The hard disk slot 52 is located on an end of the body 51, the protection switch and the hard disk slot 511 are in adjacent positions, and the cover body 10 covers an end part of the body 51.

Specifically, the protection switch is located on an end part of the body 51 and is adjacent to the hard disk slot 52, so that the cover body 10 first operates the protection switch before the hard disk 55 is removed. The cover body 10 may be a part of the body 51 and covers the body 51. The cover body 10 includes an inner surface 11 and multiple guide posts 13. The multiple guide posts 13 are disposed on a periphery of the inner surface 11. Guide holes 511 corresponding to the guide posts 13 of the cover body 10 are disposed on the end part of the body 51. The multiple guide posts 13 are inserted into the guide holes 511 correspondingly, to guide installation and positioning of the cover body 10 and the body 51.

It should be noted that, the protection switch may have multiple implementation forms, for example, may be a touch switch or a travel switch.

Figure 3:
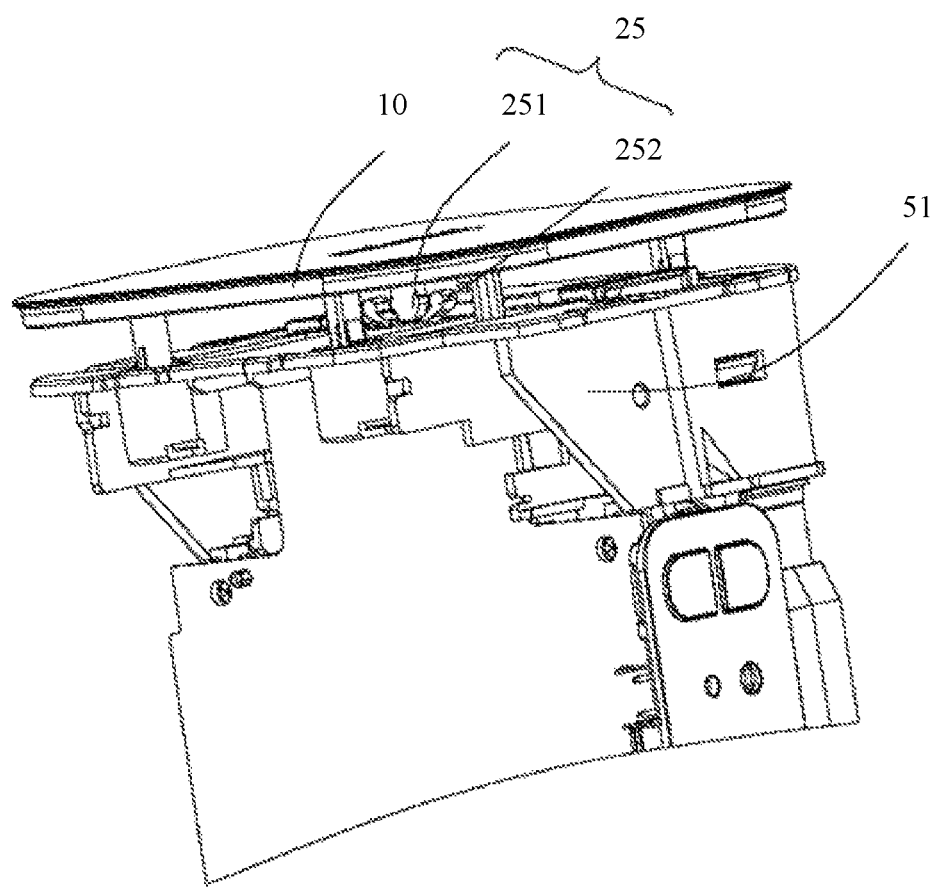
FIG. 3 is a schematic diagram, from another angle, of the terminal shown in FIG. 2.

Referring to FIG. 3, when the protection switch is a touch switch, the cover body 10 and the body 51 are locked and fastened by using a door interlock switch 25. The control part is a control rod 15 with a cross-shaped section. The control rod 15 is a rod body, and is mounted on the inner surface 11 of the cover body 10. In this embodiment, the control rod 15 and the cover body 10 are integrated together.

The touch switch 20 is mounted on the body 51. When the touch switch 20 is being used, the switch may be opened by exerting pressure on the touch switch, and opening and closing are implemented by means of pressure change of a metal spring in an inner structure of the switch. The touch switch 20 is welded on the circuit board, the cover body 10 and the body 51 are used together to seal the hard disk 55 in the body 51 of the terminal 50, and the control rod 15 is in contact with the touch switch 20. In this embodiment, when the hard disk 55 works properly, the cover body 10 is in a closed state, and an end part of the control rod 15 is in contact with the touch switch 20 but does not trigger the touch switch 20. In this case, the touch switch 20 is in a closed state.

When the hard disk 55 needs to be removed, the cover body 10 is pressed towards the body 51 when the cover body 10 is being opened, the cover body 10 drives the control rod 15 to press the touch switch 20, to open the touch switch 20, and the touch switch 20 is opened. After detecting an electrical signal variation generated due to opening of the touch switch 20, the central processing unit instructs the hard disk to perform data protection and powers off the hard disk, to stop working of the hard disk, and the hard disk can be removed safely.

After the hard disk 55 is installed into the hard disk slot 52 again, the cover body 10 is pressed, so that the door interlock switch locks the cover body 10 on the body 51. In this process, the cover body 10 drives the control rod 15 to press the touch switch 20, so that the touch switch 20 is closed. When detecting an electrical signal variation generated due to closing of the touch switch 20, the central processing unit starts the hard disk 55, so that the hard disk 55 is powered on and works.

In this implementation manner of the present invention, the cover body 10 of the router 100 is opened to drive the control rod 15 to open the touch switch 20, so that after detecting an electrical signal variation generated by the protection switch, the central processing unit instructs the hard disk to perform data protection and powers off the hard disk 55. Therefore, the hard disk can be powered off and stop running before being removed, thereby effectively preventing the hard disk from being damaged when the hard disk is being removed.

Further, the door interlock switch 25 includes a locker 251 mounted on a surface of the cover body 10 and a lock cylinder 252 that is mounted on the body 51 and that is opposite to the locker 251. The door interlock switch 25 locks and keeps the cover body 10 on the body 51. In this embodiment, the door interlock switch 25 is a common locking and keeping structure in the prior art. The locker 251 is saliently disposed on the surface 11 of the cover body 10 and is disposed in the proximity of the control rod 15. The locker 251 is an arrowhead-shaped block body. The lock cylinder 252 is mounted on the end, of the body 51, on which the hard disk slot 52 is disposed. The locker 251 is inserted into the lock cylinder 252 and is tightly buckled by the lock cylinder 252, and the cover body 10 is tightly locked on the body 51. The locker 251 is pressed and then loosened, and the locker 251 is disengaged from the lock cylinder 252. In this embodiment, an opening action by using the door interlock switch 25 is the same as actions of opening and closing the touch switch 20 by the control rod 15. Therefore, using the door interlock switch 25 is more helpful in controlling the touch switch by the control rod 15.

Figure 4:
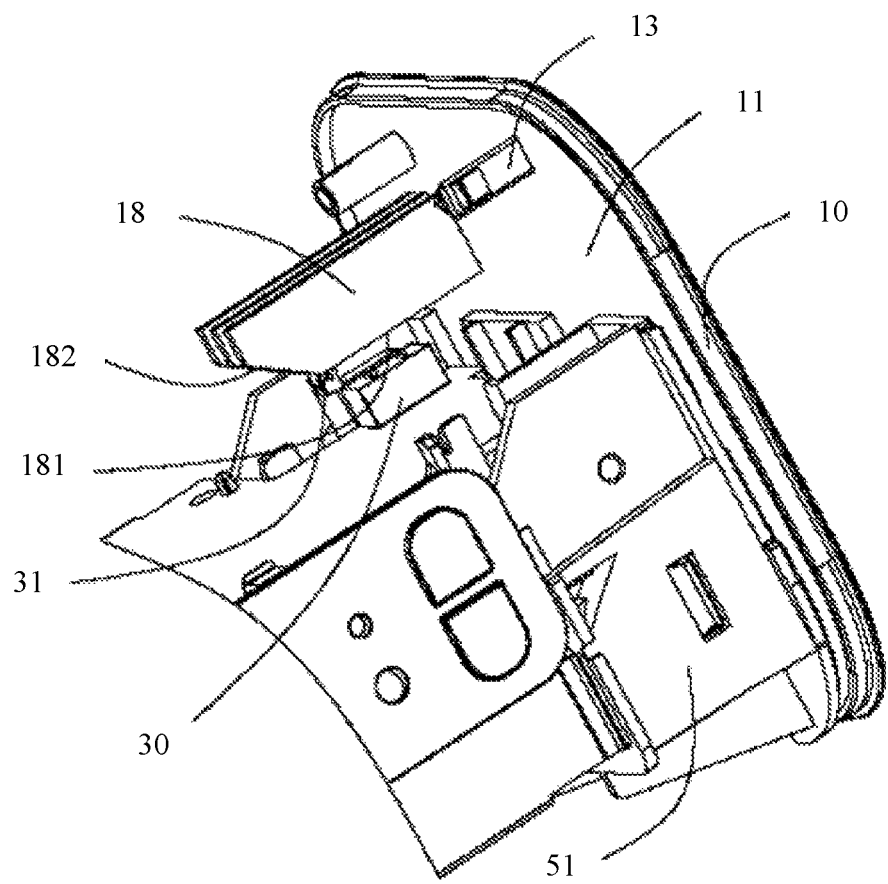
FIG. 4 is a schematic structural diagram in which a travel switch is used for the intelligent connector shown in FIG. 1.

When the protection switch is a travel switch, further referring to FIG. 4, the travel switch 30 connects or disconnects a circuit mainly according to a travel position of a moving element, so as to control working of the circuit. A switch roller 31 is disposed on the travel switch 30. When the travel switch 30 is used, the cover body 10 and the body 51 are locked and kept in a magnet adsorption manner. The control part is a control rod 18 with a rectangular rod-shaped section.

In this embodiment, an abutting face 181 and a guide slope 182 connected to the abutting face 181 are disposed on an end part, of the control rod 18, opposite to the travel switch 30. The guide slope 182 plays a guiding role in abutting between the control rod 18 and the travel switch 30.

In a closing process of the cover body 10, the control rod 18 slides over the switch roller 31 by means of guiding of the guide slope 182 until the abutting face 181 abuts against the switch roller 31. In this case, the travel switch 30 is in a closed state.

When the hard disk 55 needs to be removed, when the cover body 10 is being opened, the cover body 10 drives the control rod 18 to depart from the travel switch 30, the switch roller 31 is separated from the abutting face 181, the switch roller 31 springs, the travel switch 30 is opened, and an electrical signal variation is generated due to opening of the travel switch 30. After detecting the electrical signal variation, the central processing unit instructs the hard disk to perform data protection and powers off the hard disk, that is, stops working of the hard disk, and the hard disk can be removed safely.

After the hard disk 55 is installed into the hard disk slot 52 again, the cover body 10 covers the body 51. In this process, the control rod 18 abuts against the travel switch 30 again, and the travel switch 30 is closed. The central processing unit detects an electrical signal variation generated due to closing of the travel switch 30, and starts the hard disk 55, so that the hard disk 55 is powered on and works.

It should be noted that, the body 51 and the cover body 10 are fastened in a magnet adsorption manner. Magnets are disposed in the body 51 and the cover body 10. Alternatively, a magnet is disposed only in the cover body 10, and the body 51 is made of a metal material. Therefore, magnetic adsorption can be achieved by using the body 51 and the cover body 10.

The cover body 10 is locked and kept on the body 51 in a clamping and holding manner by using a clamping buckle and a clamping hook. The clamping buckle or the clamping hook is disposed on the periphery of the inner surface 11 of the cover body 10.

The foregoing descriptions are exemplary implementation manners of the present invention. It should be noted that a person of ordinary skill in the art may make improvements and polishing without departing from the principle of the present invention, and the improvements and polishing shall also fall within the protection scope of the present invention.

What is claimed is:
1. A terminal, comprising:
   a body;
   a cover body;
   a circuit board mounted in the body;
   a central processing unit welded on the circuit board;
   a control part mounted on the cover body; and
   a protection switch welded on the circuit board;
   wherein a hard disk slot for accommodating a hard disk is disposed in the body;
   wherein the cover body is configured to seal the hard disk in the hard disk slot when mounted on the body;
   wherein the cover body is configured to be detached from the body, wherein detaching the cover body from the body causes the control part to open the protection switch;
   wherein the terminal is configured to generate an electrical signal variation due to opening of the protection switch by the control part; and
   wherein, after detecting the electrical signal variation, the central processing unit is configured to instruct the hard disk to perform data protection and powers off the hard disk.
2. The terminal according to claim 1, wherein the protection switch is a touch switch, and the cover body is configured to cause the control part to press the touch switch, to open the touch switch.

3. The terminal according to claim 2, wherein the terminal further comprises a door interlock switch, wherein the door interlock switch comprises a locker mounted on a surface of the cover body and a lock cylinder that is mounted on the body and that is opposite to the locker, and the door interlock switch is configured to lock and keep the cover body on the body.

4. The terminal according to claim 1, wherein the protection switch is a travel switch, and the cover body is configured to cause the control part to depart from the travel switch, to open the travel switch.

5. The terminal according to claim 4, wherein an abutting face is disposed on an end part of the control part opposite to the protection switch, wherein the abutting face abuts against the protection switch.

6. The terminal according to claim 5, wherein the cover body and the body are locked and fastened in a magnet adsorption manner.

7. The terminal according to claim 5, wherein the cover body and the body are locked and fastened in a clamping and holding manner by using a clamping buckle and a clamping hook.

8. The terminal according to claim 1, wherein a guide post is disposed on the cover body, the guide post and the control part are disposed on a same surface of the cover body, and a guide hole corresponding to the guide post is disposed in the body.

9. The terminal according to claim 1, wherein the hard disk slot is located on an end of the body, the protection switch and the hard disk slot are adjacent to each other, and the cover body covers an end part of the body on which the hard disk slot is disposed.

10. The terminal according to claim 1, wherein the terminal is a router, a network server, or a set top box.

11. A terminal, comprising:
a body;
a cover body;
a circuit board mounted in the body;
a central processing unit welded on the circuit board;
a control part mounted on the cover body; and
a protection switch welded on the circuit board, wherein an abutting face of the control part is opposite to the protection switch, and the abutting face abuts against the protection switch;
wherein a hard disk slot for accommodating a hard disk is disposed in the body;
wherein the cover body is configured to seal the hard disk in the hard disk slot;
wherein the cover body is configured to be detached from the body, wherein detaching the cover body from the body causes the control part to open the protection switch;
wherein the terminal is configured to generate an electrical signal variation due to opening of the protection switch; and
wherein, after detecting the electrical signal variation, the central processing unit is configured to instruct the hard disk to perform data protection and powers off the hard disk.

12. The terminal according to claim 11, wherein the protection switch is a travel switch, and the cover body is configured to cause the control part to depart from the travel switch, to open the travel switch.

13. The terminal according to claim 12, wherein the cover body and the body are locked and fastened in a magnet adsorption manner.

14. The terminal according to claim 12, wherein the cover body and the body are locked and fastened in a clamping and holding manner by using a clamping buckle and a clamping hook.

15. A terminal, comprising:
a body;
a cover body;
a circuit board mounted in the body;
a central processing unit welded on the circuit board;
a control part mounted on the cover body;
a protection switch welded on the circuit board; and
a door interlock switch, wherein the door interlock switch comprises a locker mounted on a surface of the cover body and a lock cylinder that is mounted on the body and that is opposite to the locker, and the door interlock switch is configured to lock and keep the cover body on the body;
wherein a hard disk slot for accommodating a hard disk is disposed in the body;
wherein the cover body is configured to seal the hard disk in the hard disk slot;
wherein the cover body is configured to be detached from the body, wherein detaching the cover body from the body causes the control part to open the protection switch;
wherein the terminal is configured to generate an electrical signal variation due to opening of the protection switch; and
wherein, after detecting the electrical signal variation, the central processing unit is configured to instruct the hard disk to perform data protection and powers off the hard disk.

16. The terminal according to claim 15, wherein the cover body substantially covers a face of the hard disk that faces the cover body.

* * * * *